May 12, 1925.
C. ULFSETH
WHEAT AND FLAX SIEVE
Filed March 3, 1924
1,537,511
2 Sheets-Sheet 1
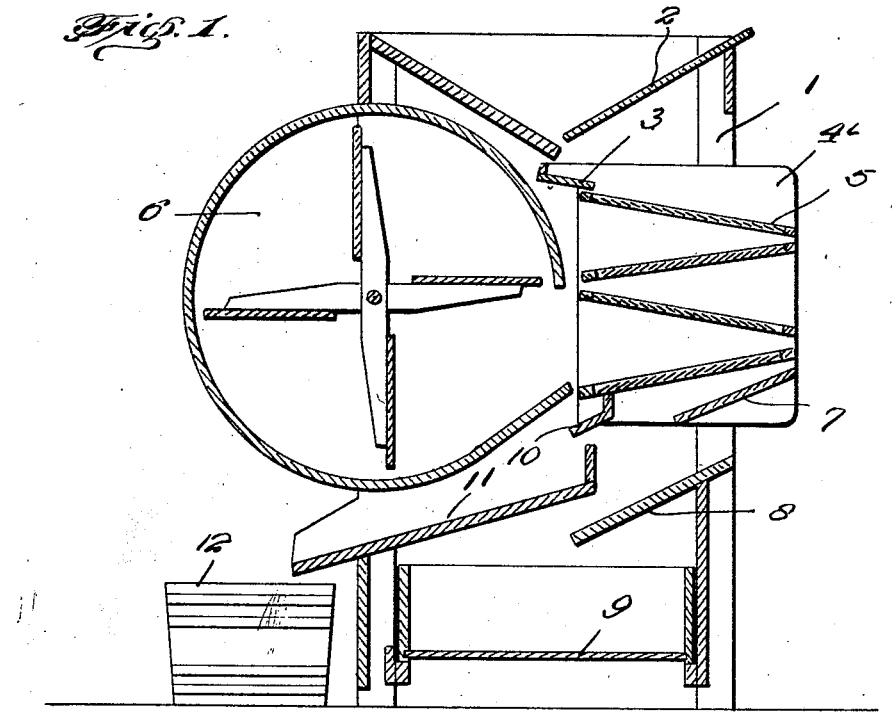
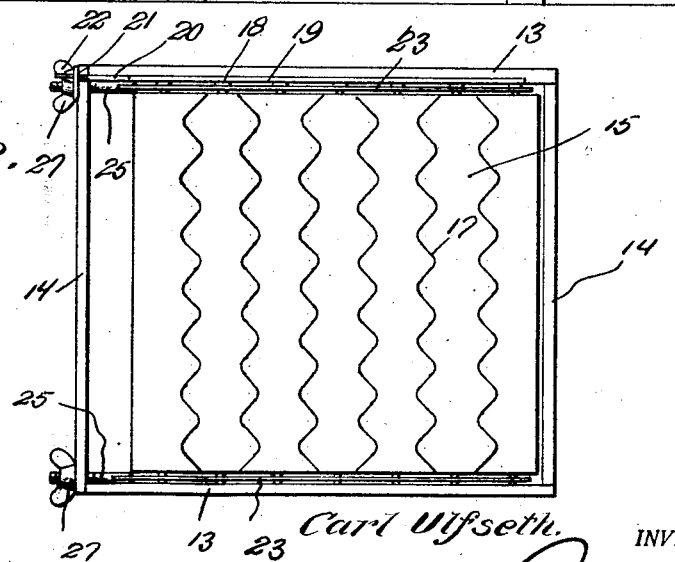
Carl Ulfseth,
INVENTOR.
BY
ATTORNEYS.

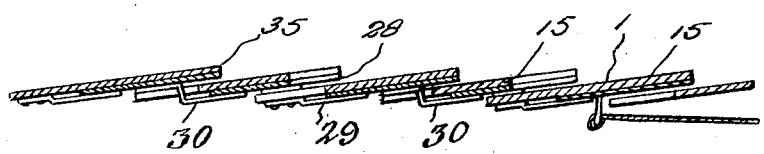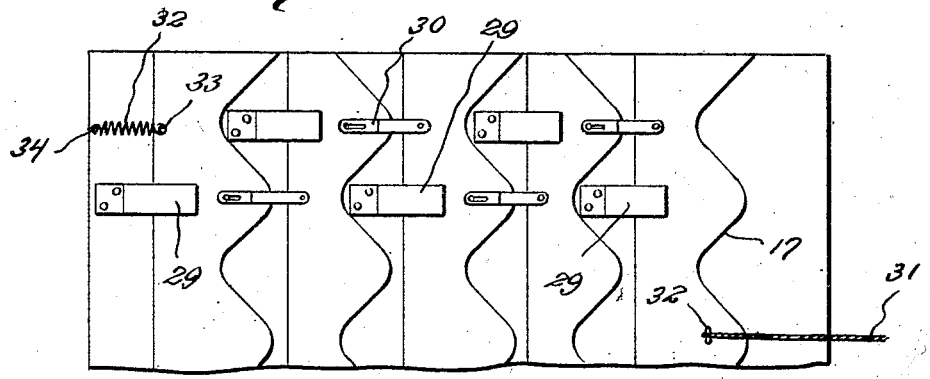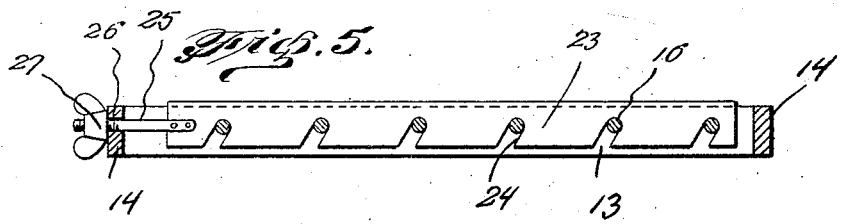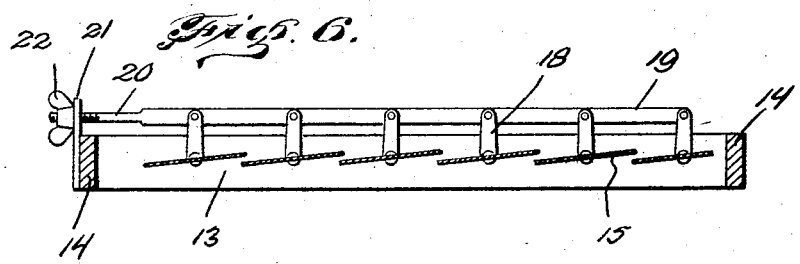

Patented May 12, 1925.

1,537,511

UNITED STATES PATENT OFFICE.

CARL ULFSETH, OF MARSHALL, MINNESOTA.

WHEAT AND FLAX SIEVE.

Application filed March 3, 1924. Serial No. 696,529.

*To all whom it may concern:*

Be it known that I, CARL ULFSETH, a citizen of the United States, residing at Marshall, in the county of Lyon and State of Minnesota, have invented certain new and useful Improvements in Wheat and Flax Sieves, of which the following is a specification.

This invention relates to sieves and particularly to a sieve for separating flax from wheat.

An object of the invention is to provide a sieve for separating flax from wheat adapted to replace a wire screen sieve and the like used in connection with a well known type of sieve having a fan blower for blowing out chaff and other like foreign matter, wherein the sieve includes a plurality of overlapped plates having means for arranging the plates to permit the passage therebetween of the flax but preventing passage of the wheat and causing the same to roll down from the upper end of the sieve to the lower end thereof and to be subsequently discharged into a container for the purpose.

Another object of the invention is to provide a sieve structure having side bars and a plurality of movable plates mounted in the side bars adapted to be arranged in overlapped relation, means also being provided for adjusting said plates to one another to vary the space between the overlapping portions of adjacent plates to permit the passage of flax therethrough but to prevent wheat from passing between the plate but causing the wheat to roll down over the tops of the plate so that the same may be separated, means also being provided at the points of mounting of the plates in the side bars for taking up wear in the mounting of the plates and holding said plates in rigid relation in the side bars.

A further object of the invention resides in providing a sieve structure of the above type having cleaning means for keeping the spaces between the plates free from dirt and other foreign matter so that the sieve will effectively function for separating flax and wheat.

The invention also includes other objects and improvements in the details of construction and arrangement of parts which are more particularly pointed out in the following detailed description and in the claims, directed to a preferred form of the invention, it being understood, however, that variations may be made in the formation of the several elements and the assemblage thereof within the scope of the description and claims.

In the drawings, forming a part of this application:

Figure 1 is a vertical sectional view through a separator in which the sieves forming the subject matter of this invention are mounted for operation.

Figure 2 is a plan view of one of the sieves constructed according to the present invention.

Figure 3 is a detail sectional view thru a plurality of sieve plates arranged in assembled relation, and to which sieve cleaners have been applied.

Figure 4 is a bottom plan view of one end portion of the sieve plate shown in Figure 3, illustrating the manner of mounting and connecting the several cleaning elements for simultaneous operation.

Figure 5 is a detail sectional view thru the sieve frame adjacent the side bars thereof, showing the manner of taking up wear and rigidly securing the sieve plates in their mountings in the side bars.

Figure 6 is a detail sectional view showing the means for adjusting the sieve plate.

1 indicates a well known form of grain sieve having a hopper 2 from which the grain is fed onto a seed plate 3 carried by the side members 4 of the rocking sieve carrying member which is adapted to movably support a plurality of sieves 5 in successively reversed inclined relation as clearly shown in Figure 1 of the drawings. A blower is indicated at 6 which is adapted to fan air through and between the sieves 5 for blowing out the chaff from the grain as it falls through from one sieve to another. In separating flax from wheat, the flax falling through the sieve will be directed by the inclined bottom 7 of the rocking member onto the inclined receiving plate 8 and into the box 9 supported in the lower portion of the sieve frame 1. Wheat passing onto the sieve rolls downwardly thereon from one end to the other, dropping at the lower end of each sieve onto the adjacent sieve below and from the lower end of the bottom sieve, is directed by the lip 10 carried by the shaking frame into the trough 11 and directed into a bucket or hopper 12.

Each of the sieves 5 is formed of side members 13 secured together in spaced relation by end members 14. A plurality of plates indicated at 15 are provided in the central portions of their ends with stub extensions 16, which are adapted to be positioned in corresponding recesses formed in the side members 13 for rotatably mounting the sieve plates in said side members. Each of the sieve plates have the edges formed of undulating contour as indicated at 17 for directing the grain passing thereover and through the sieve in a zigzag path from one end to another, in order to prevent sticking of the grains together, and also for increasing the sifting efficiency thereof.

An arm is mounted at one end of each plate as indicated at 18 and extends upwardly therefrom for pivotal connection with an adjusting bar 19, as clearly shown in Figure 6, one end of the bar extending over one of the end members and being formed with a reduced rod extension 20 slidably fitting in a bracket 21 mounted on the end member 14, a wing nut 22 being mounted on the threaded end of the rod extension 20 for adjusting the bar member 19 relative to the side bars 13 and rocking the arms 18 and sieve plates on stub extensions 16 for adjusting the space between the overlapping edges of the sieve plate for changing the effective separation action of the shaft.

A pair of wear compensating parts 23 provided on the lower edges with a plurality of inclined slots 24 corresponding in spaced relation to the stub 16 of the sieve plate are mounted on said stub extensions at each end of the sieve plate and are provided at the ends with rod members 25 extending through openings 26 in the end bars 14 of the sieve frame for threaded cooperation with adjusting and tightening wing nuts 27 which are adapted for manual operation to provide a tension of the bars and the wear compensating members 23 so as to hold the stub extensions 16 against one side of the recesses in the side bars and take up all wear between the stub extensions and the recesses therefor in the side bars so that looseness of the plates during operation of the sieve which would tend to reduce the efficiency thereof is prevented.

Sieve cleaning plates 28 corresponding in number to the sieve plates 16 are mounted on the bottom of each of these plates and are adapted to extend between the overlapped edge portions thereof as clearly shown in Figure 3. Bracket members 29 secured to the lower edges of the sieve plates 15 and having offset extensions spaced from the plates 15 serve to slidably support the cleaning plates 28 on the bottom of the respective sieve plates, while links 30 having the end portions offset and connected to adjacent sieve plates serve to insure a corresponding operation of all of the sieve plates by a single operating member 31 attached to the upper sieve plate by an eye 32 or in any suitable manner, the operating member being connected to suitable means for oscillating the cleaning plate during each oscillation of the shake frame carried in the frame 1. Coil springs 32 may be secured to the lower sieve plate as indicated at 33, the opposite end of the coil spring 32 being secured to the lower sieve plate 15 as indicated at 34, so that all of the sieve plates in a single frame are returned to a normal or non-cleaning position by the spring 32 when released by the operating means 31.

It is preferable that the upper edges of the sieve plates have the edge portions bevelled as indicated at 35 in order to permit the wheat to roll downwardly over the sieve plate from one end thereof to the other, so that it will pass through at the lower end of the sieve onto the next sieve below or onto the lip 10 to be subsequently collected in the container 12.

From the foregoing description, it will be apparent that a sieve structure has been provided wherein a frame mounts a plurality of sieve plates having undulated edges adapted to overlap one another and be arranged in spaced relation for effectively separating flax from wheat, and also that an efficient cleaning means has been provided for keeping the spaces between the plates clear of dirt or other foreign matter, so that a full efficiency in operation of the sieve will result.

What is claimed is:

1. A grain sieve including a frame having side members, a plurality of sieve plates arranged in spaced relation in said side members and rotatably mounted therein having adjacent edges arranged in overlapped relation, and means for producing a relative limited rotation of the plates with respect to one another for positioning or adjusting the overlapping portions of the plates in a predetermined spaced relation for separating grain, and means for taking up the wear between the plates and the journals thereof in the side members.

2. A grain sieve including a frame having parallel spaced side members, a plurality of sieve plates rotatably mounted in said side members having the adjacent edges of the adjacent plates arranged in overlapped relation, means for simultaneously rotating said plates in the frame for spacing the overlapped ends of each plate relative to one another, and for adjusting said spacing of the plates for separating different varieties and grades of materials, and means carried by the sieve plate for cleaning the spaces between the overlapped edges thereof.

3. A grain sieve including a frame having parallel spaced side members, a plurality of sieve plates rotatably mounted in said side members having the adjacent edges of the adjacent plates arranged in overlapped relation, means for simultaneously rotating said plates in the frame for spacing the overlapped ends of each plate relative to one another, and for adjusting said spacing of the plates for separating different varieties and grades of materials, and cleaning plates mounted for oscillating movement on the sieve plate, said cleaning plates being interconnected for simultaneous operation, and means for reciprocating said cleaning plate on the sieve plate for effecting a cleaning operation of the spaces between the overlapped ends of the sieve plates.

In testimony whereof I affix my signature.

CARL ULFSETH.